United States Patent
Rosner

(10) Patent No.: US 8,381,131 B1
(45) Date of Patent: Feb. 19, 2013

(54) SYSTEM, METHOD, AND COMPUTER PROGRAM FOR DISPLAYING TASKS AS INTERACTIVE THUMBNAILS FOR INTERACTION THEREWITH BY A USER

(75) Inventor: Dov Rosner, Kfar Yona (IL)

(73) Assignee: Amdocs Software Systems Limited, Dublin (IE)

( * ) Notice: Subject to any disclaimer, the term of this patent is extended or adjusted under 35 U.S.C. 154(b) by 548 days.

(21) Appl. No.: 12/358,031

(22) Filed: Jan. 22, 2009

(51) Int. Cl.
    *G06F 3/048* (2006.01)
(52) U.S. Cl. ...................................... 715/838
(58) Field of Classification Search .................. 715/794, 715/829, 838, 864
    See application file for complete search history.

(56) References Cited

U.S. PATENT DOCUMENTS

| | | | |
|---|---|---|---|
| 5,903,905 A * | 5/1999 | Andersen et al. ............. | 715/275 |
| 6,128,622 A * | 10/2000 | Bach et al. .................... | 717/114 |
| 6,275,829 B1 | 8/2001 | Angiulo et al. ............... | 707/104 |
| 6,938,215 B2 * | 8/2005 | Kobayashi et al. ........... | 715/810 |
| 7,007,076 B1 | 2/2006 | Hess et al. .................... | 709/219 |
| 7,345,688 B2 | 3/2008 | Baudisch et al. ............. | 345/467 |
| 7,409,644 B2 * | 8/2008 | Moore et al. .................. | 715/774 |
| 7,441,207 B2 | 10/2008 | Filner et al. .................. | 715/864 |
| 8,024,670 B1 * | 9/2011 | Rahmatian et al. ........... | 715/838 |
| 2003/0117440 A1 * | 6/2003 | Hellyar et al. ................ | 345/767 |
| 2005/0010955 A1 * | 1/2005 | Elia et al. ..................... | 725/88 |
| 2005/0057545 A1 * | 3/2005 | Tanabe ......................... | 345/204 |
| 2006/0156237 A1 * | 7/2006 | Williams et al. ............... | 715/720 |
| 2006/0242602 A1 * | 10/2006 | Schechter et al. ............ | 715/838 |
| 2007/0038963 A1 * | 2/2007 | Moore ........................... | 715/859 |
| 2007/0136675 A1 * | 6/2007 | van Wyk et al. .............. | 715/764 |
| 2007/0143711 A1 * | 6/2007 | van Wyk et al. .............. | 715/838 |
| 2007/0226637 A1 * | 9/2007 | Yaseen et al. ................. | 715/762 |
| 2008/0134095 A1 * | 6/2008 | Van Wyk et al. .............. | 715/838 |
| 2009/0193364 A1 * | 7/2009 | Jarrett et al. .................. | 715/838 |

* cited by examiner

*Primary Examiner* — Doon Chow
*Assistant Examiner* — Wilson Varga
(74) *Attorney, Agent, or Firm* — Zilka-Kotab, PC

(57) ABSTRACT

A system, method, and computer program product are provided for displaying tasks as interactive thumbnails for interaction therewith by a user. In use, a plurality of tasks are identified. Additionally, for each of the tasks, an interactive thumbnail is generated which is representative of the task. Furthermore, the thumbnails are displayed for interaction therewith by a user.

22 Claims, 5 Drawing Sheets

SYSTEM, METHOD, AND COMPUTER PROGRAM FOR DISPLAYING TASKS AS INTERACTIVE THUMBNAILS FOR INTERACTION THEREWITH BY A USER

FIELD OF THE INVENTION

The present invention relates to tasks, and more particularly to presenting tasks to users.

BACKGROUND

Traditionally, applications present users with tasks for being completed by such users. In some cases, the tasks include submitting information for various purposes. Unfortunately, conventional techniques for presenting the tasks to the users have exhibited various limitations.

Just by way of example, the tasks are generally presented via task menus, such as a textual list, where each task is only represented by a string of text (e.g. a title). The user is then usually required to select the string of text associated with a task in order to access the task for completion. This not only requires the selection by the user, but also requires the user to have knowledge of which task the string of text refers. As another example, the tasks are generally presented via task icons (i.e. toolbars). However, as with the task menus, such task icons also require selection by the user and for the user to have knowledge of which task the task icon refers. As yet another example, the tasks may be accessible via keyboard shortcuts. Unfortunately, keyboard shortcuts are difficult for users to learn, as they require the user to memorize the shortcuts or otherwise perform a look-up of the shortcuts.

To this end, conventional techniques for presenting the tasks to the users generally add cognitive burden to the user who needs to decipher icons or short menu texts to select the right option. There is thus a need for addressing these and/or other issues associated with the prior art. Just by way of example, a technique is needed for reducing training time of users, making it easier and more pleasing for the users to locate a required task, reducing errors of selecting a wrong task, etc.

SUMMARY

A system, method, and computer program product are provided for displaying tasks as interactive thumbnails for interaction therewith by a user. In use, a plurality of tasks are identified. Additionally, for each of the tasks, an interactive thumbnail is generated which is representative of the task. Furthermore, the thumbnails are displayed for interaction therewith by a user.

DETAILED DESCRIPTION

Figure 1:
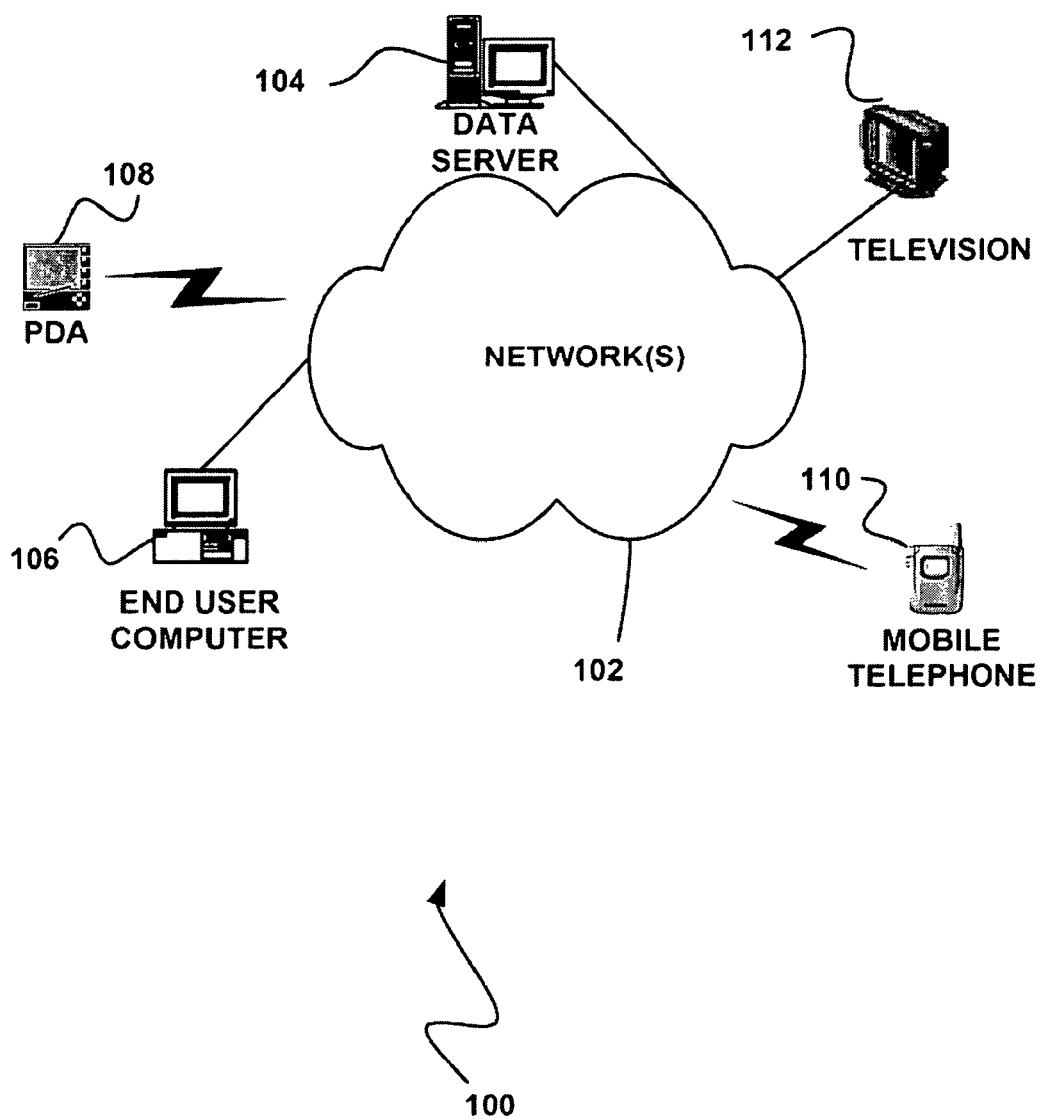
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
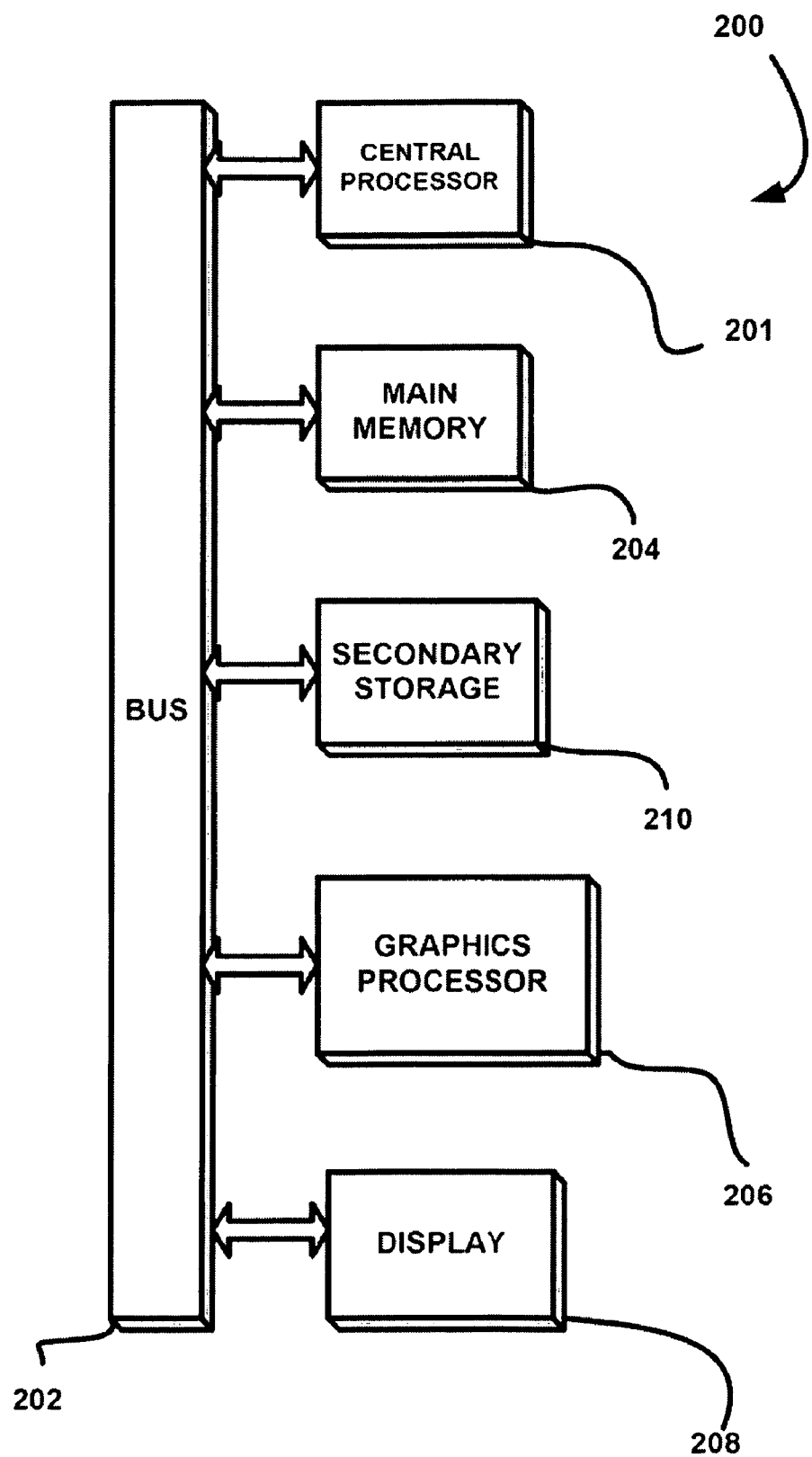
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
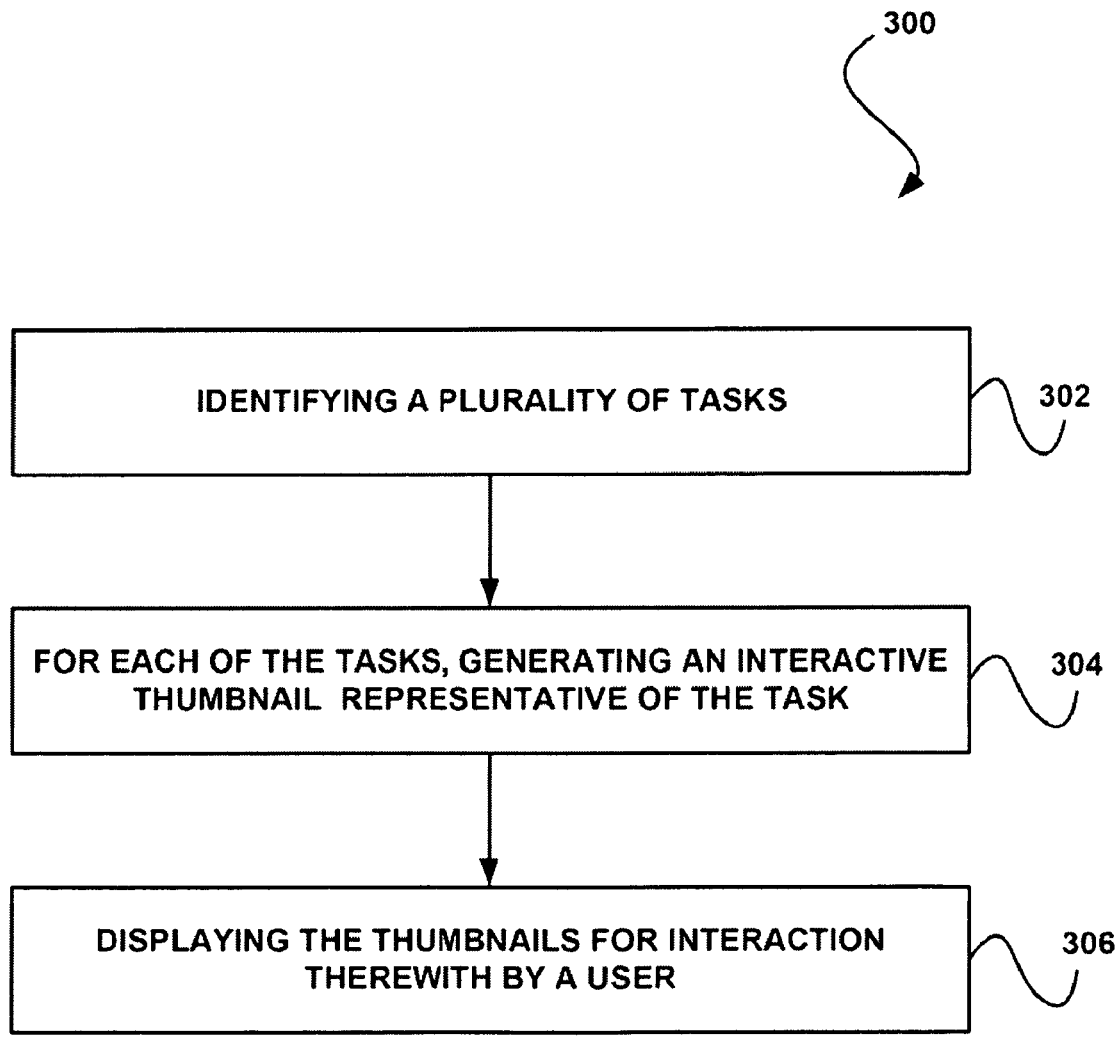
FIG. 3 illustrates a method for displaying tasks as interactive thumbnails for interaction therewith by a user, in accordance with one embodiment.

FIG. 3 illustrates a method 300 for displaying tasks as thumbnails for interaction therewith by a user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of tasks is identified. With respect to the present description, the tasks may each include any type of item capable of being completed, performed, processed, etc. For example, each of the tasks may include an item to be completed by a user, an item partially completed by the user, an item fully completed by a user (hut capable of being re-completed by the user, modified, etc.), etc.

In one embodiment, each of the tasks may include an interface for completing the task. In another embodiment, such interface may include a form. The form may be utilized for receiving user input, as an option. For example, the form may include at least one field for receiving input by the user. Thus, the form may optionally be interactive (e.g. by receiving input from the user and optionally displaying content as a function of the input).

While only a single form is disclosed above, it should be noted that each of the tasks may also include a plurality of forms. Just by way of example, the task may include a sequence of interfaces to be utilized for completing the task. To this end, the task may include an initial (i.e. first) interface that is first displayed, a second interface that is displayed after the initial interface, and so forth.

In addition, the tasks may be associated with at least one application. For example, in one embodiment, the tasks may be associated with a web application. In another embodiment, the tasks may be associated with a desktop application (e.g. located on a desktop device of a user).

As an option, the tasks may be identified by the application. For example, the application may identify the tasks as uncompleted, partially completed, etc. Of course, however, the tasks may be identified in any desired manner.

Additionally, for each of the tasks, an interactive thumbnail is generated that is representative of the task. Note operation 304. With respect to the present description, the thumbnail may include any interactive icon, image, etc. capable of representing the task that provides a link to the task. In one embodiment, selection of the thumbnail may open at least one interface of the task.

As an option, the thumbnail may be presented (e.g. displayed) to the user for utilization thereof in completing the task. With respect to the present embodiment, the thumbnail may be presented for interaction therewith by the user, as described in more detail below.

In one embodiment, the user may select the thumbnail for retrieving at least one interface to be utilized for completing the task. For example, upon selection of the thumbnail, an interface of the task may be displayed to the user [e.g. in a graphical user interface (GUI) separate from the GUI in which the thumbnail is displayed]. Accordingly, the user may complete the task via the interface (e.g. by inputting data into the interface, etc.).

In another embodiment, the thumbnail may depict an interface of the task. The interface may include a default interface. For example, the interface that the thumbnail depicts by default may include an initial interface of the task (e.g. that would otherwise be displayed first upon selection of the thumbnail by the user).

Accordingly, the thumbnail is interactive such that an interactive interface may be provided). As another option, the thumbnail may be a form. For example, the thumbnail may be an active form capable of receiving input from the user and optionally displaying content as a function of the input.

In one embodiment, the thumbnail may allow the user to navigate between a plurality of interfaces of the task represented by the thumbnail. For example, an interface of the task depicted by the thumbnail may include an option for navigating to another interface of the task (e.g. a next interface in a sequence of interfaces of the task, etc.). Thus, upon selection of the option, the thumbnail may optionally depict another interface of the task.

In yet another embodiment, the thumbnail may optionally depict fields of the interface of the task for receiving input by the user. To this end, the input may be received by the user via the thumbnail. For example, the user may enter the input in the thumbnail.

Moreover, based on the receipt of the input via the thumbnail, at least a portion of the task represented by the thumbnail may be completed. In one embodiment, the user may enter input in the fields of the thumbnail for completing the task. In another embodiment, the task may be completed by selecting at least one default option on the thumbnail.

In one embodiment, the thumbnail may be generated automatically. For example, the thumbnail may be generated automatically in response to identification of the task. Thus, if the default interface depicted by the thumbnail includes an initial interface of the task represented by the thumbnail, then the thumbnail may be generated automatically to depict the initial interface of the task. Of course, however, the thumbnail may be generated automatically to depict any default interface of the task, as an option.

In another embodiment, the thumbnail may be generated manually. For example, the thumbnail may be developed by a programmer.

Still yet, as shown in operation 306, the thumbnails are displayed for interaction therewith by a user. The user as referred to herein may include any person to which the thumbnails may be displayed for interaction therewith. For example, the user may be a user of a computing device which displays the thumbnails such that the user may interact with the thumbnails.

It should be noted that the interaction may include any interaction with the thumbnail that is performed by the user. For example, as described above, the interaction may include selecting the thumbnail for completing, at least in part, the task. As another example and as also described above, the interaction may include completing, at least in part, the task via the thumbnail (e.g. by entering input in the thumbnail).

In one embodiment, the thumbnails may be displayed in a single interface. For example, the thumbnails may be displayed in an interface of the application associated therewith. Optionally, the thumbnails may be displayed as a menu (e.g. a menu of tasks).

By displaying the tasks as thumbnails capable of interaction therewith, the user may visually determine the task associated with each thumbnail by simply viewing the thumbnail. Moreover, interactive thumbnails may optionally allow the user to complete the task, at least in part, via the thumbnail, thereby preventing a requirement that the user open the task (by selecting the thumbnail to link to the task) for completion thereof. For example, the user may be capable of starting the task from the thumbnail. In this way, training time of users is reduced, it easier and more pleasing for the users to locate a required task, errors of selecting a wrong task is reduced, etc. (e.g. (e.g. by allowing the user to visually determine the task by way of the thumbnail).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
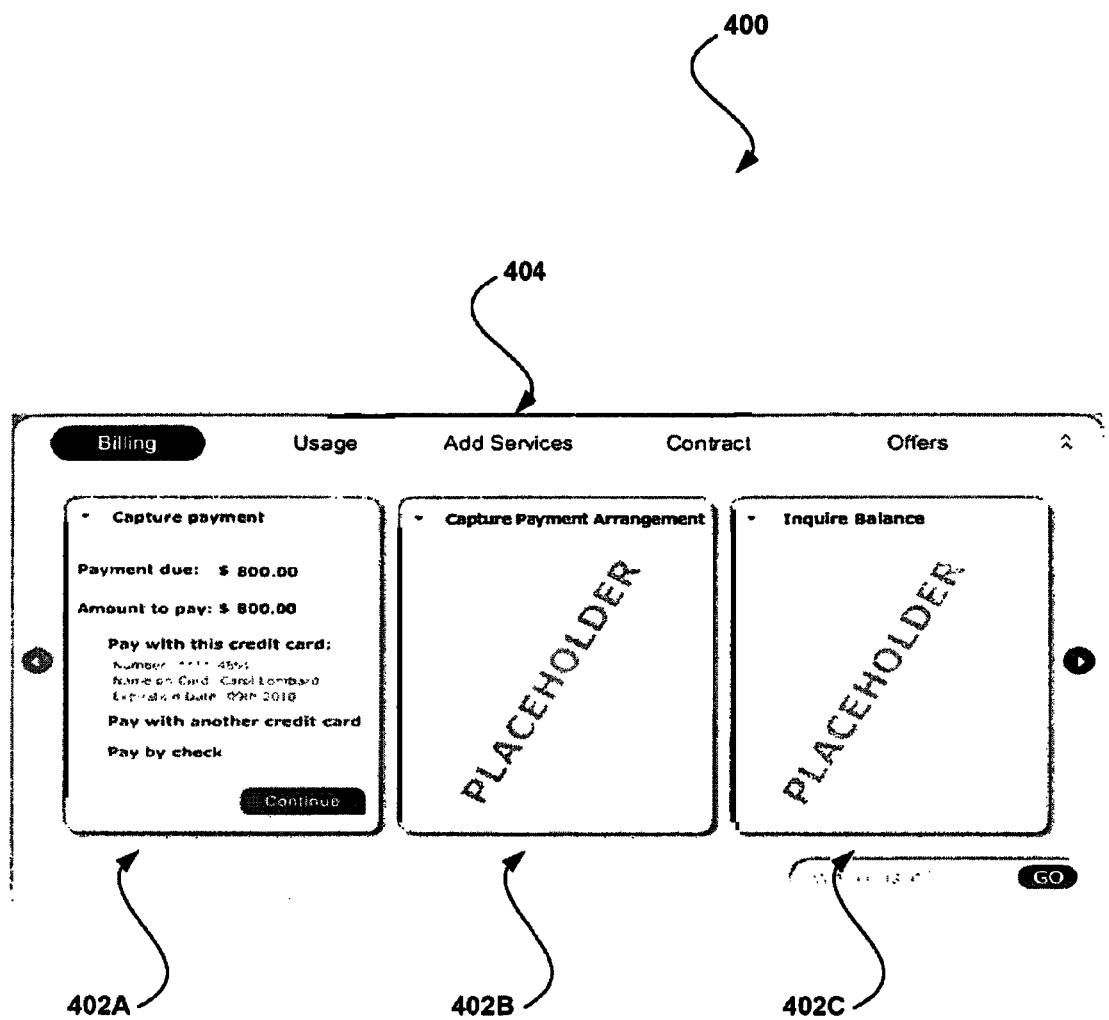
FIG. 4 illustrates a graphical user interface (GUI) for displaying tasks as interactive thumbnails for interaction therewith by a user, in accordance with another embodiment.

FIG. 4 illustrates a GUI 400 for displaying tasks as thumbnails for interaction therewith by a user, in accordance with another embodiment. As an option, the GUI 400 may be implemented in the context of the details of FIGS. 1-3. Of course, however, the GUI 400 may be implemented in any desired environment. Further, the aforementioned definitions may equally apply to the description below.

As shown, the GUI 400 includes a plurality of interactive thumbnails 402A-C. Each thumbnail 402A-C represents a different task, in the context of the present embodiment. The tasks may be associated with a single application, as an option. In one embodiment, the application may include a web application for a goods and/or services provider.

The single application may provide the menu 404 for accessing thumbnails for various categories of tasks. For example, as shown, the menu 404 may include a billing category. The billing category may include thumbnails of tasks for making payments for goods and/or services).

The menu 404 may also include a usage category. The usage category may include thumbnails of tasks for requesting reports on network usage, for example. As another example, the usage category may include thumbnails of tasks for modifying configurations, etc. associated with network usage (e.g. available network usage).

In another embodiment, the menu 404 may include an add services category. The add services category may include thumbnails of tasks for subscribing to a service. Thus, a user may complete a task to subscribe to a service by selecting the add services option on the menu 404 and selecting or interacting with a thumbnail representing a task to subscribe to the service.

In yet another embodiment, the menu 404 may include a contract category. The contract category may optionally include thumbnails of tasks for requesting to view a contract. For example, the contract may include a contract entered into by the user for subscribing to a service.

Still yet, the menu 404 may include an offers category. The offers category may include thumbnails of tasks for requesting to view information associated with goods and/or services that are offered. For example, the goods may include goods for sale and/or the services may include services to which a subscription may be received.

With respect to the billing category, the first thumbnail 402A included in such category represents a task to be completed by a user for submitting a payment. The payment may be for a good and/or service, and while payment via a credit card is shown, it should be noted that in other embodiments, the payment may be made via a bank transfer, an electronic check, etc.

The first thumbnail 402A depicts an interface of the task to be utilized by the user for completing a portion of the task. Optionally, the interface may include an initial interface of the task. Of course, however, the interface may include any interface of the task.

In particular, the interface of the task includes a form capable of being completed by the user. As shown, the form includes field for the user to enter an input value. Of course, it should be noted that the form may include any number of different fields for allowing the user to enter input values therein.

As also shown, the form includes a "Continue" option for allowing the user to continue to another interface (e.g. form) of the task. The other interface may include a next interface in a sequence of interfaces of the task, for example. Thus, upon selection of the "Continue" option from the first thumbnail 402A, the first thumbnail 402A may depict the other interface.

Moreover, the form includes a link to an additional interface (i.e. the "View Charge Breakdown" shown). The other interface may include a next interface in a sequence of interfaces of the task, for example. Of course, as another example, the other interface may include any other interface of the task (which, in the context of a sequence of interfaces of the task, may be prior to the interface depicted by the first thumbnail 402A or subsequent to the interface depicted by the first thumbnail 402A). Upon selection of the link to the additional information, the first thumbnail 402A may depict the other interface pointed to by the additional information link.

In one embodiment, the user may select the first thumbnail 402A for opening the interface. In this way, the interface may be opened in a GUI separate from the first thumbnail 402A. Furthermore, the user may complete the task via the opened interface by entering input in the form. Accordingly, the user may complete the task separately from the first thumbnail 402A.

In another embodiment, the user may complete the task, at least in part, via the first thumbnail 402A. For example, the user may enter a value into the first thumbnail 402A (e.g. into the field of the form depicted by the first thumbnail 402A). As another example, the user may navigate to another interface of the task via the first thumbnail 402A by selecting the "Continue" option on the first thumbnail 402A. As an option, the form may be structured in such a way that for the most common flow (e.g. pay the full bill with the same credit card as last time) no additional form will be presented, thereby allowing the task to be completed from the thumbnail for making the process of completing the task efficient.

Also with respect to the billing category, the second thumbnail 402B included in such category represents a task to be completed by a user for capturing a payment arrangement. While not shown, the second thumbnail 402B includes an interactive thumbnail. For example, the second thumbnail 402B may depict a form of the represented task that is capable of being completed by the user via the thumbnail 402B.

Furthermore, with respect to the billing category, the third thumbnail 402C included in such category represents a task to be completed by a user inquiring a balance. While not shown, the third thumbnail 402C includes an interactive thumbnail. For example, the third thumbnail 402C may depict a form of the represented task that is capable of being completed by the user via the thumbnail 402C.

Figure 5:
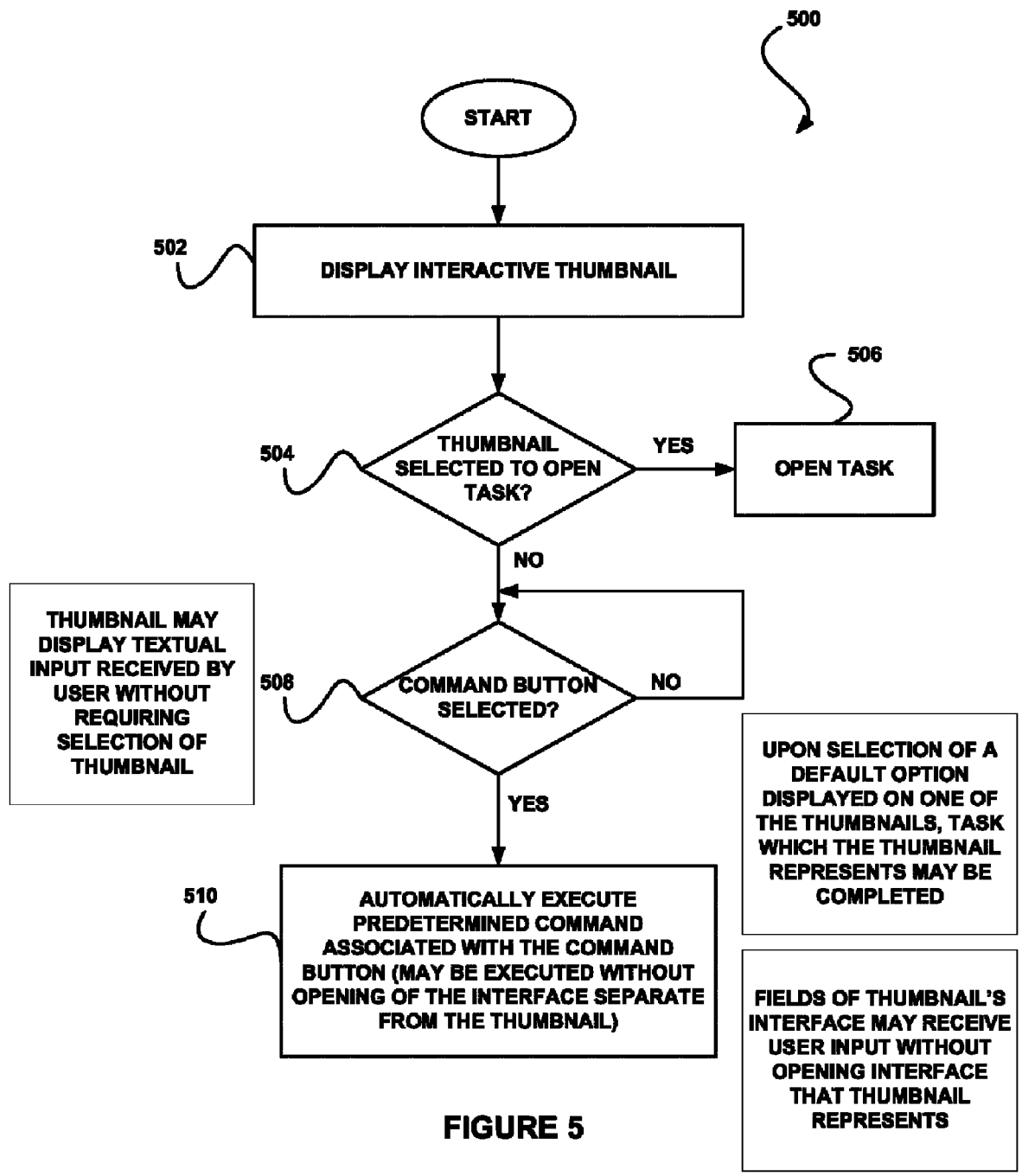
FIG. 5 illustrates a method for completing a task via a thumbnail, in accordance with yet another embodiment.

FIG. 5 illustrates a method 500 for completing a task via a thumbnail, in accordance with yet another embodiment. As an option, the method 500 may be carried out in the context of the details of FIGS. 1-4. Of course, however, the method 500 may be carried out in any desired environment. Again, the aforementioned definitions may equally apply to the description below.

As shown in operation 502, an interactive thumbnail is displayed. With respect to the present embodiment, the thumbnail includes an interactive thumbnail that is representative of a task. For example, the thumbnail may depict a first interface of the task. Thus, the thumbnail may optionally be selected for opening the task, or may allow the task to be completed within the thumbnail.

In one embodiment, the thumbnail may include a field capable of receiving input from a user. The field may include a text field, a numerical field, a checkbox, etc. Of course, however, the thumbnail may include a plurality of fields, in other embodiments.

In another embodiment, the thumbnail may include at least one command button. The command button may be utilized for automatically initiating an action. For example, upon selection of the button by a user, a predetermined action associated with the button may be executed.

As an option, the predetermined action may include submitting (e.g. to a remote destination, to the application that generated the task, etc.) information included in the thumbnail, such as information entered into the field of the thumbnail. As another option, the predetermined action may include entering a default value into the field of the thumbnail. As yet another option, the predetermined action may include navigating to another interface of the task.

In decision 504, it is determined whether a user selects the thumbnail for the purpose opening the task. Selecting the thumbnail may include double-clicking the thumbnail and/or any other predefined action indicative of a request to open the task represented by the thumbnail. As another option, selecting the thumbnail may include the user hovering over the thumbnail for a predetermined amount of time (e.g. 1.5 seconds).

If it is determined that a user selects to open the task via the thumbnail, an initial interface of the task is displayed in a GUI separate from the thumbnail. Note operation 506. Accordingly, the task may be completed via the separate GUI. Just by way of example. If the user hovers over the thumbnail for the predetermined amount of time, the thumbnail may be expanded in a larger GUI (e.g. to make it easier for the user to input data into such thumbnail for completing the task).

If, however, it is determined that a user does not select to open the task via the thumbnail, it is determined whether the user selects a command button included in the thumbnail. Note operation 508. If a command button is not selected, the method 500 continues to wait for a command button to be selected. If however, a command button is selected, the predetermined action associated with the command is automatically executed, as shown in operation 510.

In this way, a user may enter input into the thumbnail and/or select command buttons via the thumbnail for completing the task represented by the thumbnail. It should be noted that such completion may include submitting all information requested by the task, approving execution of the task, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying a plurality of tasks;
   computer code for generating, for each of the tasks, an interactive thumbnail representative of the task;
   computer code for displaying the thumbnails for interaction therewith by a user, at least one of the thumbnails including at least one command button utilized for automatically initiating an action based on a selection of the at least one command button by the user;
   computer code for, upon selection of at least one of the thumbnails by the user, opening an interface of the one or more tasks which the selected at least one thumbnail represents, the interface of the one or more tasks being separate from the displayed thumbnails; and
   computer code for, upon selection of the at least one command button of the at least one thumbnail by the user, automatically initiating the action without the opening of the interface of the one or more tasks which the at least one thumbnail represents and which is separate from the displayed thumbnails.

2. The computer program of claim 1, wherein the tasks are associated with an application.

3. The computer program of claim 1, wherein each of the tasks includes a form.

4. The computer program of claim 3, wherein the form is interactive.

5. The computer program of claim 3, wherein the form includes at least one field for receiving input by the user.

6. The computer program of claim 1, wherein the thumbnails allow navigation between interfaces of the tasks.

7. The computer program of claim 1, wherein at least one of the thumbnails includes an active form.

8. The computer program of claim 1, wherein each of the thumbnails depicts an interface of the task which the thumbnail represents.

9. The computer program of claim 8, wherein at least one of the thumbnails depicts fields of the thumbnail's depicted interface for receiving input by the user.

10. The computer program of claim 9, wherein the at least one thumbnail depicting the fields of the thumbnail's depicted interface receives the input by the user via the thumbnail.

11. The computer program of claim 1, further comprising computer code for receiving input from the user via at least one of the thumbnails.

12. The computer program of claim 11, wherein the user enters the input in the at least one of the thumbnails via which the input is received.

13. The computer program of claim 11, further comprising computer code for completing at least a portion of the one or more tasks represented by the at least one of the thumbnails via which the input is received based on the input.

14. The computer program of claim 1, wherein the thumbnails are displayed in a single interface.

15. The computer program of claim 1, wherein the thumbnails are displayed as a menu.

16. The computer program of claim 1, further comprising computer code for, upon selection by the user of a default option displayed on one of the thumbnails, completing the task which the thumbnail represents.

17. A method, comprising:
    identifying a plurality of tasks;
    for each of the tasks, generating an interactive thumbnail representative of the task;
    displaying the thumbnails for interaction therewith by a user, at least one of the thumbnails including at least one command button utilized for automatically initiating an action based on a selection of the at least one command button by the user;
    upon selection of at least one of the thumbnails by the user, opening an interface of the one or more tasks which the selected at least one thumbnail represents, the interface of the one or more tasks being separate from the displayed thumbnails; and
    upon selection of the at least one command button of the at least one thumbnail by the user, automatically initiating the action without the opening of the interface of the one or more tasks which the at least one thumbnail represents and which is separate from the displayed thumbnails.

18. A system, comprising:
    a processor for:
        identifying a plurality of tasks,
        generating, for each of the tasks, an interactive thumbnail representative of the task,
        displaying the thumbnails for interaction therewith by a user, at least one of the thumbnails including at least one command button utilized for automatically initiating an action based on a selection of the at least one command button by the user,
        upon selection of at least one of the thumbnails by the user, opening an interface of the one or more tasks which the selected at least one thumbnail represents, the interface of the one or more tasks being separate from the displayed thumbnails, and
        upon selection of the at least one command button of the at least one thumbnail by the user, automatically initiating the action without the opening of the interface of the one or more tasks which the at least one thumbnail represents and which is separate from the displayed thumbnails.

19. The system of claim 18, wherein the processor is coupled to memory via a bus.

20. The computer program of claim 1, wherein the interface is an initial interface of a plurality of interfaces that are associated with the selected at least one thumbnail.

21. The computer program of claim 10, wherein the fields of the thumbnail's depicted interface receives the input by the user via the thumbnail without the opening of the interface of the task which the thumbnail represents.

22. The computer program of claim 21, wherein the thumbnail displays the input received by the user, without requiring a selection of the thumbnail.

* * * * *